United States Patent [19]

Kawabe et al.

[11] 4,017,960

[45] Apr. 19, 1977

[54] METHOD OF REPAIRING INJURED PORTION OF REFRACTORY FURNACE-LINING

[75] Inventors: Naoshi Kawabe; Toshikatu Haga, both of Iwaki; Taiitu Nakajima, Tokyo; Takeshi Takahashi, Sagamihara; Hiroshi Shinoda, Gifu; Shuji Hayakawa, Nagoya, all of Japan

[73] Assignees: Kureha Kagaku Kogyo Kabushiki Kaisha, Tokyo; NGK Insulators, Ltd., Nagoya, both of Japan

[22] Filed: Nov. 26, 1975

[21] Appl. No.: 635,354

[52] U.S. Cl. .............................. 29/401 E; 228/119; 264/30; 264/80; 264/248; 264/332
[51] Int. Cl.² .................. B23P 7/00; F27D 1/16
[58] Field of Search ............. 264/30, 80, 248, 332; 29/401 D, 401 E, 401 F; 228/119; 299/14

[56] References Cited

UNITED STATES PATENTS

| | | | |
|---|---|---|---|
| 1,765,558 | 6/1930 | Anderson | 264/30 |
| 2,903,778 | 9/1959 | Gibson | 264/30 X |
| 2,968,083 | 1/1961 | Lentz | 264/30 |
| 3,533,905 | 10/1970 | O'Menra | 264/332 X |
| 3,791,697 | 2/1974 | Hokao | 299/14 |

*Primary Examiner*—Thomas P. Pavelko
*Attorney, Agent, or Firm*—Flynn & Frishauf

[57] ABSTRACT

A method of repairing an injured portion of a refractory furnace-lining characterized by cutting off the injured portion of said lining through the furnace shell using a specific supersonic flame jet cutter; inserting a rigid refractory lining block having a shape which is similar to that of the through-cut hole of the furnace body; and welding the surrounding periphery of the inserted block to the contact surface of said through-cut hole using the above-mentioned supersonic flame jet cutter as a welder, followed by repairing the outside cut-off shell portion of the furnace body.

5 Claims, No Drawings

METHOD OF REPAIRING INJURED PORTION OF REFRACTORY FURNACE-LINING

BACKGROUND OF THE INVENTION

This invention pertains to a method of repairing furnace, kiln or oven, and particularly relates to a method of repairing injured portion of refractory furnace-lining. (Hereinafter, in the specification and claims, furnace, kiln and oven are referred to collectively as "furnace".).

Heretofore, there has been used a method of repairing a furnace which comprises cutting off after cooling the surface the injured portion of refractory furnace-lining by means of "chipping work by hand" using a chisel or machine drill to make a drilled hollow, and filling the hollow with a refractory material. This method, however, has a fault that the time and labor required for accomplishing the work are tremendous with the resultant work-efficiency being quite low. Furthermore, when the chipping work is carried out, numerous cracks are caused in the lining by the action of striking the chisel or drill. On account of this cracking, the remaining portion of the lining frequently can not be depended upon for secure use.

There is another prior method which does not include cutting off the injured portion of the refractory furnace-lining. This method comprises spraying a slurry of refractory material over said injured portion to fill the hole caused by the injury, followed by finishing up by means of shoveling or patching step. This method, however, has a fault that the adhered refractory material is liable to peel off from the substrate. Furthermore, when the spraying work is carried out, there is a big rebound loss of the slurry, resulting in an uneconomical consumption of the refractory material.

The present inventors made an attempt to remove the faults mentioned above, using an acetylene burner or oxyhydrogen burner for a general metal-working. Specifically, these burners were used to cut off the injured portion of refractory lining, and then a rigid refractory lining block shaped to conform to the cut-hole was inserted thereinto, followed by welding the periphery of said block to the contact surface of the cut-hole using the same burner as mentioned above. It was found, however, that the temperature of the burner flame was too low to effect a satisfactory cutting off of the injured portion of the lining. Further, the burner was quite unable to carry out the welding.

SUMMARY OF THE INVENTION

In the present invention, a specific supersonic flame jet cutter, which does not use thermit as a supplementary pyrogen, is used as a cutter concurrently with a welder in the above-mentioned practice. This supersonic flame jet cutter resembles the one taught in U.S. Pat. No. 3,791,697, which uses thermit as a supplementary pyrogen and is employed only for cutting concrete, stone or stone-like materials.

DETAILED DESCRIPTION OF THE PREFERRED EMBODIMENT

One method according to the present invention comprises cutting off the injured portion of a refractory furnace-lining through the outside furnace shell of said portion using a specific supersonic flame jet cutter mentioned above, inserting a rigid refractory lining block substantially equal in shape and size to the through-cut hole, and welding the periphery of the inserted rigid block to the contact surface of said through-cut hole, using the above-mentioned supersonic flame jet cutter as a welder, followed by repairing the outside cut-off shell portion of the furnace.

The function of supersonic flame jet cutter is as follows. A liquid fuel of high calorific value, such as kerosene, naphtha, benzol, toluene and xylene, is sprayed into the combustion chamber of the cutter by an injector, which is set in the cutter, under high pressure of about 25 to 45 kg/cm$^2$, and the fuel spray is mixed with oxygen gas of the same pressure as the above concurrently blown into the combustion chamber, and then the mixture burns rapidly to produce a supersonic flame jet, whose temperature is in the range of from 3000° to 3800° K and the Mach number of the flame jet is 5 to 8.

The construction of the supersonic flame jet cutters used for the method of this invention is similar to that of U.S. Pat. No. 3,791,697, excepting that there is no thermit powder supply pipe 23 which is shown in FIGS. 1 to 4 of the above-mentioned U.S. patent. Said U.S. patent relates to cutting concrete, stone or stone-like materials, and does not relate to welding these materials. The reason why thermit need not be used in this invention is that the melting point of refractory furnace-lining material is lower than that of concrete, stone and stone-like materials.

Experiments in cutting several kinds of square refractory block having 120 mm of thickness and 250 mm of height in a vertical direction were carried out. The melting points of these refractory materials and the required times of cutting these blocks are shown in Table 1.

Table 1

| | Results of cutting experiments | | |
| --- | --- | --- | --- |
| | Stabilized Zirconious refractory | Aluminous refractory | Mullite refractory |
| Required time for cutting (min.) | 13 | 9 | 7 |
| Melting point of refractory (° K) | 2900 | 2300 | 2100 |

When welding, the inserted block having substantially the same shape, size and material as those of the through-cut hole may be welded directly to the peripheral surface of said through-cut hole without using any subsidiary welding rod. However, according to another aspect of the present invention it is preferred to weld a refractory block, whose size is somewhat smaller than that of the through-cut hole to make a clearance between them, to the peripheral surface of said hole using a subsidiary welding rod which is made of the same material as that of lining together with a small amount of binder such as sodium tertiary phosphate.

The effective merits of this invention are as follows.

1. Cutting and welding can be carried out in an extremely short time. Furthermore, heat loss of the hot furnace during the repairing period can be diminished, as it is unnecessary to cool the furnace before the repair-work, resulting in that the operation-stopping duration can be markedly decreased. For instance, while the repairing period of an injured high temperature (1700° to 1900° K) gas duct connected to a petroleum cracking furnace is about 7 days by means of the customary method, it can be reduced to about 2 days according to the method of this invention. Furthermore, additional injury to the furnace accompanying with cooling can be excluded from the repairing work.

2. The injured portion of the refractory furnace-lining is cut off very easily through the outside furnace shell of said portion in a minimum area and optional shape. Therefore, the required amount of repairing materials can be reduced.

3. The welded insertion is strictly fixed to the remaining lining, and never peeled off therefrom during the re-operation of the furnace.

4. The furnace shell can be easily cut off together with the injured portion of the refractory furnace-lining by the specific supersonic flame jet cutter, while it is tolerably difficult to cut off said shell lined with a refractory material by means of an acetylene burner or oxyhydrogen burner.

The furnace to which the method of this invention is applicable includes a cracking furnace, reactor, hot stove, blast furnace, rotary kiln, hot gas duct and furnaces for the ceramic industry, etc.

EXAMPLES

The process of the present invention will be more fully understood by referring to the following examples.

EXAMPLE 1

Repairing of an injured portion of a high temperature (1500° to 1700° K) air duct having 1000 mm of inner diameter and 114 mm of lining thickness, connected to a blast furnace, was carried out in the following manner. The duct was made of an aluminous refractory material.

The injured portion including a hot spot generated by a burner flame during the routine operation was cut off from the duct wall together with the outer shell using a supersonic flame jet cutter which uses no thermit. The size of the through-cut hole was 240 mm × 240 mm × 114 mm (thickness) and the time required for cutting was 36 minutes. Then, a shaped refractory block made of the same material as that of the duct lining, the size thereof being 230 mm × 230 mm × 114 mm (thickness), was inserted into said hole, and the clearance between them was welded using a welding rod made of an aluminous substance and the supersonic flame jet cutter mentioned above as a welder. The time required for this welding was about 75 minutes. Finally, the outer side of the repaired lining was covered with an iron patch.

The above-mentioned repairing was carried out in a hot state of the duct immediately after stopping the routine operation thereof. When the repairing was finished, the operation of the duct was started without delay. The required time from said stopping to re-starting of the duct operation was about 3 hours. Comparatively, the required repair time in the usual cases of cooling and chipping is about 7 days.

EXAMPLE 2

The same process as in Example 1 was carried out excepting that the surrounding peripheral surface of the shaped refractory block was applied with an ointment which essentially consisted of aluminous mortar mixed with sodium tertiary phosphate as a binder. In this case, the time required for welding was reduced to about 20 minutes.

What we claim is:

1. A method of repairing an injured portion of a refractory furnace-lining which comprises:
   cutting off the injured portion of said lining through the outside furnace shell of said portion together with said shell using a supersonic flame jet cutter without using thermit;
   inserting a rigid refractory lining block, having substantially the same shape and size as said through-cut hole, into said through-cut hole; and
   welding the surrounding periphery of the inserted block to the contact surface of said through-cut hole using the above-mentioned supersonic flame jet cutter as a welder without using thermit, followed by repairing the outside cut-off shell portion of the furnace.

2. A method of repairing an injured portion of a refractory furnace-lining which comprises:
   cutting off the injured portion of said lining through the outside furnace shell of said portion together with said shell using a supersonic flame jet cutter without using thermit;
   inserting a rigid refractory lining block, which has substantially the same shape as that of said through-cut hole and which is somewhat smaller than said through-cut hole to make a clearance between them, into said through-cut hole; and
   welding the surrounding periphery of the inserted block to the wall surface of said through-cut hole using the above-mentioned supersonic flame jet cutter as a welder without using thermit and using a welding rod of the same material as that of the lining material together with a binding substance, followed by repairing the outside cut-off shell portion of the furnace.

3. The method according to claim 1, wherein the furnace is one of a cracking furnace, reactor, hot stove, blast furnace, rotary kiln, hot gas duct and furnaces for the ceramic industry.

4. The method according to claim 2, wherein the furnace is one of a cracking furnace, reactor, hot stove, blast furnace, rotary kiln, hot gas duct and furnaces for the ceramic industry.

5. The method according to claim 2, wherein the binding substance is sodium tertiary phosphate.

* * * * *